March 12, 1957 B. OSTENDORF, JR 2,785,225

ELECTRONIC REGENERATIVE REPEATER

Filed Feb. 18, 1949 3 Sheets-Sheet 1

INVENTOR
B. OSTENDORF, JR.
BY R. C. Terry
ATTORNEY

March 12, 1957 B. OSTENDORF, JR 2,785,225

ELECTRONIC REGENERATIVE REPEATER

Filed Feb. 18, 1949 3 Sheets-Sheet 2

INVENTOR
B. OSTENDORF, JR.
BY R. C. Perry
ATTORNEY

March 12, 1957 B. OSTENDORF, JR 2,785,225

ELECTRONIC REGENERATIVE REPEATER

Filed Feb. 18, 1949 3 Sheets-Sheet 3

INVENTOR
B. OSTENDORF, JR.
BY R. C. Perry
ATTORNEY

United States Patent Office 2,785,225
Patented Mar. 12, 1957

2,785,225

ELECTRONIC REGENERATIVE REPEATER

Bernard Ostendorf, Jr., Stamford, Conn., assignor to Bell Telephone Laboratories, Incorporated, New York, N. Y., a corporation of New York Application February 18, 1949, Serial No. 77,169

21 Claims. (Cl. 178—70)

This invention relates to telegraph repeaters, and particularly to regenerative repeaters comprised of electronic components.

An object of the invention is to regeneratively repeat telegraph signals entirely by electron discharge instrumentalities and without electromagnetic relays.

Another object of the invention is to tolerate severe distortion of incoming signals without requiring orientation adjustment.

Another object of the invention is to render the repeater unresponsive to short "hits" incoming over a telegraph channel and impressed on the input of the repeater.

Another object of the invention is to provide in a regenerative repeater an output circuit having low impedance to impulse transition currents.

The invention features an arrangement in which the electronic regenerative repeater may receive signals from the receiving leg of a hub circuit and may transmit the regenerated signals into the sending leg of the hub circuit.

The invention also features a timing circuit for timing the duration of telegraph signal code combinations, said circuit comprising a plurality of vacuum tube flip-flop circuits connected in cascade.

The invention also features an arrangement whereby the character timing circuit is not set in operation unless a spacing condition received when the repeater is in the rest or idle condition exceeds a predetermined minimum duration.

In accordance with one embodiment of the invention the repeater consists entirely of vacuum tube circuits and its principal components are a signal receiving tube, a signal retransmitting tube, a timing oscillator, a selecting circuit and a character timing circuit. The timing oscillator is normally dormant and upon response of the signal receiving tube to a start element, the oscillator is set in operation and generates a sine wave potential at the rate of one cycle per impulse interval of correctly timed permutation code signals. Upon being set in operation the oscillator continues in operation independently of the signal receiving tube until it has been restored to the dormant condition by the character timing circuit in preparation for response to the next start impulse. The selecting circuit is a flip-flop arrangement of vacuum tubes driven by the oscillator and arranged to drive the signal retransmitting tube to marking or spacing condition once in each cycle of the oscillator in accordance with the marking or spacing condition of the signal element impressed upon the receiving tube at that time. The character timing circuit is in the nature of a binary counter comprising three stages of vacuum tube flip-flop circuits connected in cascade. Such a circuit, starting from any predetermined initial condition, and responding to operating pulses, passes through a complete cycle and returns to that initial condition upon receiving eight impulses. In operation, two impulses are impressed upon the character timing circuit during the first cycle of the timing oscillator, and thereafter pulses derived from the oscillator are impressed upon the timing circuit at the rate of one effective pulse per cycle of the oscillator. The counting of seven impulses, representing the start element, five code elements and the stop element of telegraph signals, plus the extra impulse in the first cycle of the oscillator, carries the timing circuit through its complete cycle to its initial condition, and upon reaching this condition it deactivates the timing oscillator if the signal receiving tube is then responding to the stop impulse, as it should be.

If the signal receiving tube is not responding to the stop impulse when the timing circuit completes a cycle, as in the case of response of the repeater to a prolonged spacing signal exceeding the duration of a permutation code combination, a condition sometimes identified as a break signal, the oscillator will not stop, but will continue to run. Upon the passing of the character timing circuit out of the condition corresponding to its initial condition in response to the first of the two impulses applied to the character timing circuit in the next cycle of the oscillator, the character timing circuit thereafter precludes the stopping of the oscillator earlier than completion of a full counting cycle of the character timing circuit, even though a marking condition is received by the receiving tube during that cycle of the circuit. Continuation of this marking signal to the end of the counting cycle of the character timing circuit will result in the stopping of the oscillator. A prolonged spacing or break signal may endure for a sufficient interval to permit continuous running of the oscillator while the character timing circuit is driven through several cycles. The oscillator will be restored to dormancy at the end of the cycle of the timing circuit during which the prolonged spacing or break signal terminates.

The application of the first or extra impulse to the timing circuit is dependent upon continuous reception of a spacing signal condition until the occurrence of that impulse, which is timed to occur substantially at the middle of the start impulse, which is an interval of one-half impulse after a mark-to-space transition on the input circuit following a rest or idle condition. A full retransmitting cycle of operation of the repeater is not initiated until the first impulse has been applied to the counting circuit. By virtue of this arrangement the regenerative repeater is insensitive to responses of its input circuit to "hits" or other disturbances simulating a spacing condition and having a duration of less than one-half of a telegraph impulse, in that the timing circuit is not affected by spacing impulses not exceeding that duration and in the absence of tripping of the timing circuit the output circuit does not respond to the spurious response of the input circuit.

In an alternative embodiment of the invention diodes are employed for selectively causing the retransmission of marking and spacing impulses, and the output circuit is arranged to present like impedances to the outgoing line conductor for both types of impulses.

For a complete understanding of the invention reference may be had to the following detailed description to be interpreted in the light of the accompanying drawings wherein.

Figures 1, 1A:
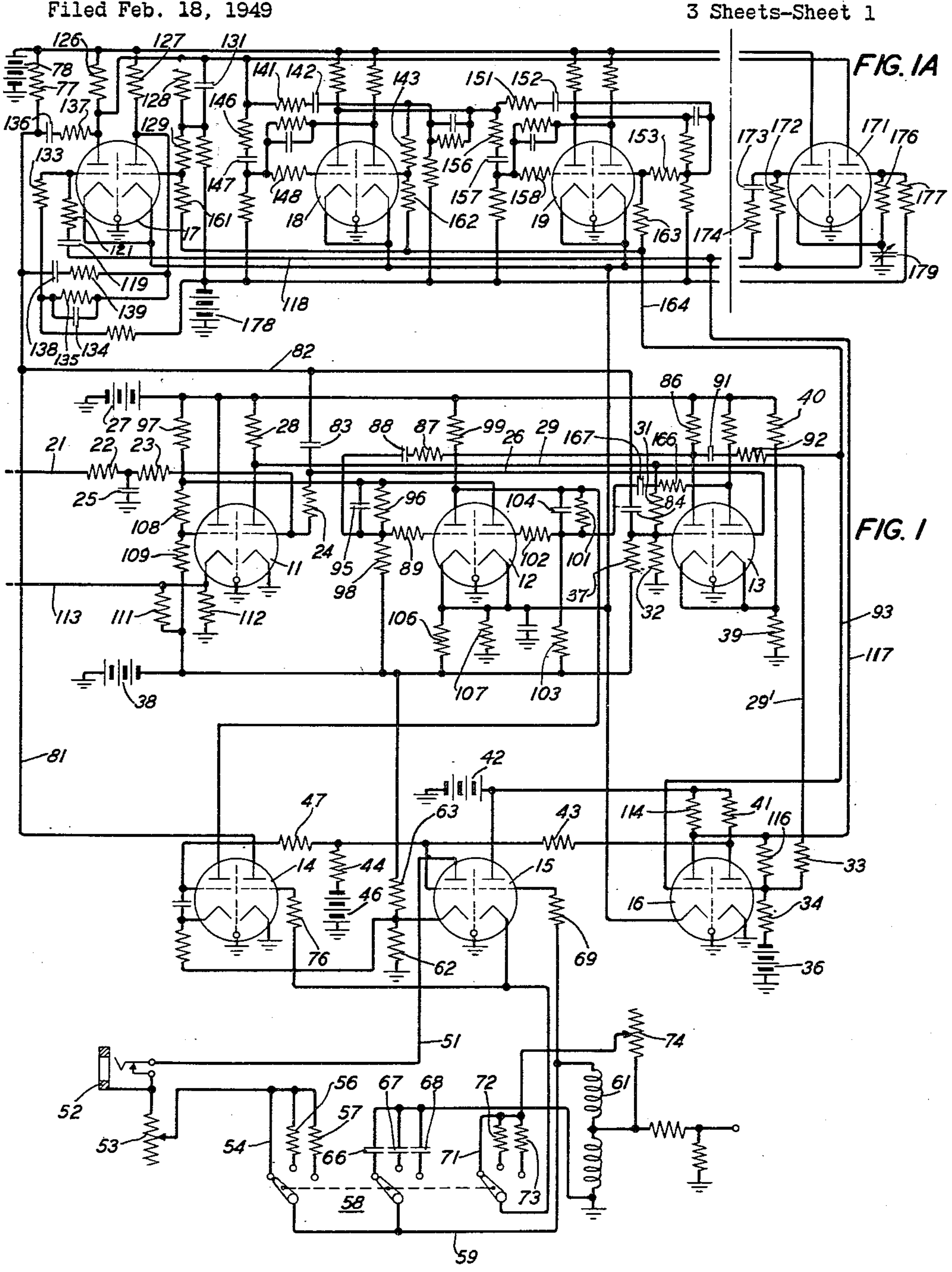
Fig. 1 is a schematic circuit showing one embodiment of an electronic regenerative repeater in accordance with the present invention.
Fig. 1A is a schematic circuit supplemental to Fig. 1 to increase the impulse counting capacity of the character timing circuit.

Referring now to the drawings and particularly to Fig. 1 it is found that the regenerative repeater comprises nine vacuum tubes, identified by the reference numerals 11, 12, 13, 14, 15, 16, 17, 18 and 19, and that each vacuum tube has left and right-hand triode sections. These tubes perform the following functions and in the idle condition of the repeater have the indicated condition of conductivity:

1. The right-hand triode of tube 11 receives incoming signals and is normally conductive. The left-hand triode of that tube serves to transmit outgoing signals and is also normally conductive.

2. The tube 12 is a selector hold and its right-hand triode controls the grid of the left-hand triode of tube 11, becoming conductive for the retransmission of a spacing impulse and thereby cutting off the left-hand triode of tube 11. The two sections of tube 12 are interconnected in a flip-flop circuit, the left-hand section being cut off when the right-hand section becomes conductive. The left-hand triode of tube 12, when conductive, cuts off the right-hand triode to restore marking signal transmission. In the idle condition the left-hand triode is conductive and the right-hand triode is cut off.

3. Tube 13 is a selector-modulator tube to control selector tube 12. Its right-hand triode is held far beyond cut-off along with the right-hand triode (receiving section) of tube 11 when a spacing impulse is being received, while the left-hand triode is not so highly biased and is permitted to conduct in response to a timing pulse applied through a blocking condenser by tube 14. During a marking signal the left-hand triode of tube 13 is held far beyond cut-off by the right-hand anode of tube 11, while the right-hand triode section is not so highly biased and is permitted to conduct in response to a timing impulse. The anodes of tube 13 are resistance-capacity coupled to the corresponding grids of tube 12. Either triode of tube 13 conducts only momentarily and neither triode is conducting during the idle condition.

4. The tube 14 has functions described as pulsing and mark restoring. The right-hand triode receives high positive or negative voltages from the cathode of the right-hand triode of tube 15, and being thus highly overloaded, it saturates or cuts off sharply, thereby having substantially square-wave output which is applied through blocking condensers to the grids of tube 13 as timing pulses used in signal selection. The right-hand triode is normally conducting. The left-hand triode conducts in unison with the left-hand triode of tube 15 and has a common load resistor with the left-hand triode of tube 12 to assure that in the stop or rest condition the right-hand triode of tube 12 is cut off and as a result a marking condition is transmitted. The left-hand triode of tube 14 is normally conducting during idle periods.

5. Tube 15 comprises an oscillator and stop control therefor. The right-hand triode is the oscillator section and is normally non-oscillating. The left-hand triode is normally conductive, and when conductive it holds the oscillator dormant.

6. Tube 16 functions as an oscillator control tube. The right-hand triode is normally cut off and becomes conductive under the control of the right-hand triode of tube 11 when that triode is cut off in response to the start impulse. The right-hand triode of tube 16 cuts off the left-hand triodes of tubes 14 and 15, the latter serving to permit the oscillator to start oscillating. The left-hand triode of tube 16 is normally conductive and cuts off under the control of the left-hand triode of tube 13 to supply the initial pulse to the character timing or impulse counting circuit which comprises tubes 17, 18 and 19.

7. Tubes 17, 18 and 19 comprise three flip-flop circuits connected in cascade. The right-hand triode of each is normally conducting. When the left-hand triode of tube 16 cuts off it applies a positive pulse to the grid of the left-hand triode of tube 17, which activates the left-hand triode, thereby cutting off the right-hand triode. A negative pulse resulting from activation of the left-hand triode of tube 17 is applied to both grids of tube 18, causing the right-hand triode to cut off, as a result of which the left-hand triode becomes conductive. A negative pulse resulting from activation of the left-hand triode of tube 18 similarly causes the right-hand triode of tube 19 to cut off and the left-hand triode to become conductive. Each of the three tubes has thus been reversed as a result of the initial pulse from tube 16. Thereafter uniformly spaced timing pulses are applied by the right-hand triode of tube 14 over paths which will be specifically identified hereinafter to the grids of both triodes of tube 17. Tube 17 reverses on every negative timing impulse, tube 18 reverses on every other negative timing impulse and tube 19 reverses on every fourth negative impulse. Tube 17 returns to its initial condition in response to the first, third, fifth and seventh of the timing pulses. Tube 18 returns to its initial condition in response to the second and sixth of the timing impulses and tube 19 returns to its initial condition in response to the fourth timing pulse. From this it follows that the condition of the timing circuit comprising tubes 17, 18 and 19 which has been described as the normal or idle condition is arrived at in response to the seventh timing pulse after the circuit was stepped off normal. With the tubes 17, 18 and 19 in this condition the left-hand triode of tube 16 is conditioned to become conductive and it becomes conductive, cutting off the right-hand triode of tube 16 by grid control if that triode is concurrently conditioned for cut-off by reception of the stop impulse of marking nature by the right-hand triode of tube 11. If the right-hand triode of tube 16 cuts off as it should it reactivates the left-hand triode of tube 15 which stops the oscillator.

The idle condition of the repeater having been set forth in the foregoing paragraphs the details of operation in response to a received code combination will now be described. Signals are impressed on the repeater by way of conductor 21 from a receiving circuit which may be any one of those shown in copending application Serial No. 67,996 filed December 29, 1948 by J. R. Davey and W. T. Rea, which matured into Patent 2,608,619 granted August 26, 1952, and the disclosure of that patent is incorporated herein by reference as part of the present specification. Each of the four figures of that patent includes a symbolic showing of a regenerative repeater, and the repeaters described herein satisfy those symbolic representations. Marking and spacing conditions on conductor 21 are represented by positive and negative voltages of equal numerical value, as for example 40 volts, in accordance with one embodiment of the invention. These potentials are applied through a noise filter comprising resistors 22 and 23 and condenser 25 to the grid of the right-hand triode of vacuum tube 11. The cathode of the right-hand triode section of tube 11 is directly grounded. Because of the fact that the triode draws grid current if the grid attempts to swing positive relative to the cathode and thereby to produce a voltage drop across resistors 22 and 23, these resistors in association with the grid result in a limiting action whereby the marking potential of the grid of the right-hand triode of tube 11 relative to the cathode is approximately zero and the spacing potential is the full negative potential of conductor 21.

When the start impulse, of spacing nature, is applied over conductor 21 to the grid of the right-hand triode of tube 11 that tube cuts off. The grid of the right-hand triode of tube 13 is connected to that of tube 11 through resistor 24 and conductor 26, but since the right-hand triode of tube 13 is not conductive in the idle condition of the repeater the application of the negative potential to its grid has no effect upon the tube.

The anode of the right-hand triode of tube 11 is connected to positive battery 27 through load resistor 28. The anode is also connected by conductor 29 and resistor 31 to the grid of the left-hand triode section of tube 13 from which a conductive path is also traced through resistor 32 to ground, and the anode of the right-hand triode of tube 11 is further connected through conductor 29' and resistor 33 to the grid of the right-hand triode of tube 16, from which a path is also traced through resistor 34 to the negative terminal of battery 36.

With the cutting off the right-hand triode of tube 11 its anode swings toward positive, also carrying toward positive the grids of the left-hand triode section of tube 13 and the right-hand triode section of tube 16. In addition to the path traced from the grid of the left-hand triode of tube 13 to ground through resistor 32 there is also a path through resistor 37 to the negative terminal of battery 38. This grid is thus seen to be connected to a potential divider system comprising batteries 27 and 38 and resistors 28, 31, 32 and 37 and the anode-cathode discharge path of right-hand triode of tube 11, the net effect of which is that the grid of the left-hand triode of tube 13 swings toward approximately zero volts when the right-hand section of tube 11 is cut off, and swings toward negative when the right-hand triode of tube 11 is conductive. In summary, the right-hand grid of tube 13 is at zero voltage for a spacing signal and is negative for a marking signal, while the left grid is negative for a spacing signal and is at zero for a marking signal. The cathodes of the both sections of tube 13 are connected to the junction of resistors 40 and 39 which are connected in series between positive terminal of battery 27 and ground. This biasing potential is such that neither section of tube 13 is rendered conductive solely as a result of zero voltage being applied to its grid, but that whichever grid has zero voltage impressed upon it (the left grid during the start pulse) is capable of amplifying positive pulses which are applied thereto, as will be described later.

The cathode of the right-hand triode of tube 16 is connected to ground and the potential which the grid receives through resistor 33 when the right-hand triode of tube 11 cuts off is sufficient to render the right-hand triode of tube 16 conductive.

The anode of the right-hand section of tube 16 is connected through resistor 41 to the positive terminal of battery 42. The anode of this tube section is also connected through resistor 43 to the grid of the left-hand triode of tube 15 and thence through resistor 44 to the negative terminal of battery 46. The grid of the left-hand triode section of tube 14 is connected through resistor 47 to that of the left-hand triode section of tube 15. Both of these triodes, having been conductive during the idle condition, now have their grids carried sufficiently negative relative to their cathodes, by the right-hand anode of tube 16, to cut them off.

For the time being the cutting off of the left-hand triode of tube 14 will be disregarded. The anode of the left-hand triode of tube 15 is connected through conductor 51, break contacts of test jack 52, variable resistor 53, strap 54 or one or the other of resistors 56 and 57 connected to the left-hand contacts of multiple bank selector switch 58, left-hand contactor of that switch, conductor 59 and tapped inductance coil 61, the upper and lower portions of which are inductively coupled, to ground. The cathode of the left-hand triode of tube 15 is connected to the junction of resistors 62 and 63 connected in series between the negative terminal of battery 38 and ground. The cathode of the left-hand triode of tube 15 is thus negative with respect to ground and since the anode is returned to ground through inductance 61 the anode is positive with respect to the cathode and before the triode is cut off the discharge current flows in a circuit including inductance 61.

Inductance 61, shunted by any one of condensers 66, 67 or 68 associated with the contacts of the middle bank of multiple bank selector switch 58, comprises the tank circuit for an oscillator which includes the right-hand triode of tube 15. The anode of that tube section is connected directly to the positive terminal of battery 42, the grid is connected through grid resistor 69 to the upper terminal of inductance 61 and the cathode is connected through strap 71 or one of the resistors 72 and 73 associated with the right-hand contact of multiple bank switch 58 and then through variable resistor 74 to the tap or intermediate terminal of inductance 61.

With the discharge current of the left-hand triode of tube 15 flowing through inductance coil 61 during the idle condition of the repeater a steady state electromagnetic field is maintained and the oscillator is prevented from oscillating. Upon the cutting off of the left-hand triode of tube 15 the direct current through the inductance 61 becomes an oscillatory current and the circuit just described begins to oscillate without transients. A start-stop oscillator and vacuum tube control therefor to which the arrangement just described is generally similar is disclosed in Patent 2,438,492 granted March 20, 1948, to H. M. Bascom et al. A similar start-stop oscillator circuit in which the starting and stopping is controlled by a cold cathode gas-filled tube is disclosed in Patent 2,454,089 granted November 16, 1948, to W. T. Rea et al. The frequency of the oscillator is such that the interval occupied by one cycle is equal to the interval of a correctly timed start or significant impulse of a start-stop code combination.

The cathode of the right-hand triode (oscillator section) of tube 15 is connected through resistor 76 to the grid of the right-hand triode of tube 14. This triode section has its cathode grounded and its anode connected through load resistor 77 to the positive terminal of battery 78. The sine wave voltage appearing on the cathode of the oscillator tube is high enough to overload the right-hand triode of tube 14 so that an approximately square-wave signal appears at the anode of that triode. The first half-cycle of the sine wave is positive but since the right-hand triode of tube 14 is conducting at the time the oscillation starts and the initial change in grid voltage is toward positive only a very small change in the potential of the anode occurs at the beginning of the first cycle of the sine wave, which coincides substantially with the beginning of the received start impulse. At the end of the first half cycle, when the sine wave swings negative the right-hand triode of tube 14 cuts off sharply, thereby causing the anode potential to swing toward positive. This voltage transition occurs at the theoretically correct time for the center of the incoming start impulse. Subsequent voltage transitions at the anode of the right-hand triode of tube 14 are alternately toward negative and toward positive. The transitions toward negative occur at the theoretically correct time for the end of the start impulse, the end of each significant impulse and the end of one unit of stop time. The transitions toward positive occur at the theoretically correct time for the center of the start impulse, the center of each significant impulse and the center of the first unit of stop time.

The anode of the right-hand triode of tube 14 is connected through conductors 81 and 82 and condensers 83 and 84 to the grids of the right and left-hand triodes of tube 13. The voltage transition of the anode of the right-hand triode of tube 14 in a positive direction, which occurs at the theoretical center of the start impulse, as previously stated, is impressed as a positive timing pulse on the grids of tube 13. The incoming start impulse of spacing nature is holding the right-hand triode of tube 13 beyond cut-off so that the positive impulse applied to the right-hand grid cannot produce conductivity, whereas the positive impulse applied to the left-hand grid causes the left-hand triode to conduct because the left-hand grid has a potential, obtained from the anode of the right-hand triode of tube 11, that is only slightly beyond cut-off.

The left-hand anode of tube 13, which has load resistor 86, is connected through resistor 87, condenser 88 and resistor 89 to the grid of the left-hand triode of tube 12, and is also connected through condenser 91, resistor 92 and conductor 93 to the grid of the left-hand triode of tube 16. Grid resistor 89 is connected by resistor 96 to the anode of the right-hand triode of tube 12, which has load resistor 97 and is also connected by resistor 98 to the negative terminal of battery 38. The anode of the left-hand triode of tube 12 has load resistor 99 and is connected through resistor 101 and the grid resistor 102 to the grid of the right-hand triode of tube 12. Grid resistor 102 is also connected by resistor 103 to the negative terminal of battery 38. Resistors 96 and 101, cross-connecting the anodes and grids of tube 12, are shunted by condensers 95 and 104 respectively. The cathodes of tube 12 are connected to a potential divider comprising resistors 106 and 107 connected between negative terminal and battery 38 and ground.

The cross connections between anode and grid electrodes of tube 12 establish a flip-flop circuit. The two triodes of the tube are so biased that when either triode is conductive the anode applies a cut-off potential to the grid of the other triode. As previously stated the left-hand triode is conductive during the idle condition of the repeater. The momentary negative swing of the left-hand anode of tube 13 as the left-hand section of the tube conducts causes a negative pulse to be impressed through condenser 88 on the grid of the left-hand triode of tube 12, cutting off that triode. The left-hand anode of tube 12 goes toward positive, raising the grid potential of the right-hand triode of tube 12 so that that triode becomes conductive. With the right-hand triode conductive its anode swings toward negative, applying a cut-off potential to the grid of the left-hand triode through resistor 96 which will hold that triode cut off after the negative pulse from the anode of the left-hand triode of tube 13 has been dissipated.

The grid of the left-hand triode of tube 11 is also connected to the right-hand anode of tube 12 through resistor 108 and in addition is connected through resistor 109 to the negative terminal of battery 38. The left-hand triode of tube 11 is normally conductive and the negative swing applied to the grid by the right-hand anode of tube 12 causes the left-hand triode of tube 11 to cut off.

The left-hand triode of tube 11 has no anode load resistor but has a cathode load, the cathode being connected to a potentiometer comprising resistors 111 and 112 connected between the negative terminal of battery 38 and ground. An output or transmitting conductor 113 is also connected to the cathode of the left-hand triode of tube 11. When the left-hand triode is conductive, which is the idle or marking condition the cathode is at a positive potential relative to ground and this positive potential is impressed upon transmitting conductor 113 as the marking condition. When the left-hand triode cuts off under the control of the right-hand triode of tube 12 the potential difference across resistor 112 reverses and the cathode and transmitting conductor 113 become negative with respect to ground, which is the spacing condition. The positive and negative output potentials may have equal numerical values which may be of the order of 40 volts. In this way the retransmission of the start impulse of spacing nature is initiated at the theoretical center of the received start impulse, by virtue of the fact that it is initiated at substantially the end of the first half cycle of the oscillator.

Returning to consideration of the left-hand triode of tube 13, when that triode became conductive momentarily a negative pulse was impressed through condenser 91, resistor 92 and conductor 93 on the grid of the left-hand triode of tube 16. This triode is normally conductive and the negative pulse applied to its grid causes it to cut off. The left-hand triode of tube 16 has load resistor 114 connected to the positive terminal of battery 42. The anode of this triode is connected through resistor 116 to the grid of the right-hand triode. With the left-hand triode cut off its anode and the right-hand grid swing toward positive and the potential applied to the grid is such that when the right-hand triode of tube 11 responds to a marking impulse and becomes conductive, thereby removing from the grid of the right-hand triode of tube 16 the potential which was applied over conductors 29 and 29' and through resistor 33 to the right-hand grid of tube 16 to render the right-hand triode of that tube conductive, that triode will remain conductive. With the right-hand triode of tube 16 maintained conductive by the left-hand triode, the left-hand triode of tube 15 remains cut off and the oscillator continues to oscillate. Without the superimposition of a conductive condition on the right-hand grid of tube 16 the right-hand triode of that tube would be cut off in response to the first marking impulse of the code combination, the left-hand triode of tube 15 would be rendered conductive and the oscillator would be stopped, thus preventing continuous operation of the oscillator for a full code combination.

Another connection from the anode of the left-hand triode of tube 16 is extended over conductors 117 and 118 and through condenser 119 and resistor 121 to the left-hand grid of tube 17. Tube 17 is the first of three counting tubes, the other two being identified by the reference numerals 18 and 19. The two triodes of each of the three tubes comprise a flip-flop circuit. Thus tube 17 has load resistors 126 and 127 connected to the positive terminal of battery 78, the left-hand anode connected to the right-hand grid through resistors 128 and 129, the former shunted by condenser 131, and the right-hand anode is connected to the left-hand grid through resistors 132 and 133, the former being shunted by condenser 134. From the anode of the right-hand triode of tube 14, which is the source of timing pulses, there is a connection through conductor 81 condenser 136 and resistor 137 to the anode-connected terminal of resistor 128, through which the right-hand grid is coupled to the left-hand anode and there is also a connection through condenser 138 and resistor 139 to the anode-connected terminal of resistor 132 through which the left-hand grid is coupled to the right-hand anode.

From the left-hand anode only of tube 17 there is a driving connection through resistor 141, condenser 142 and resistor 143 to the right-hand grid of tube 18 and another connection through resistor 146, condenser 147 and resistor 148 to the left-hand grid of tube 18. The anodes and grids of tube 18 are cross-connected in a manner similar to tube 17. There is a driving connection from the left-hand anode only of tube 18 through resistor 151, condenser 152 and resistor 153 to the right-hand grid of tube 19 and through resistor 156, condenser 157 and resistor 158 to the left-hand grid of tube 19. The anodes and grids of tube 19 are likewise cross-connected for flip-flop action.

As set forth in the brief description of the counting circuit comprising tubes 17, 18 and 19, the right-hand triode of each is conductive in the idle condition. It follows from this that the left-hand triodes are held at cut-off by the anode potentials of the respective right-hand triodes. The detailed description of the counting circuit was introduced by reference to the connection from the left-hand anode of tube 16 through condenser 119 and resistor 121 to the left-hand grid of tube 17. When the left-hand triode of tube 16 was cut off and its anode swung toward positive a pulse of that polarity was impressed over the path just traced to the left-hand grid of tube 17. This pulse overcomes the cut-off potential applied to the grid from the right-hand anode of tube 17 and renders the left-hand triode conductive. The left-hand anode swings toward negative, carrying with it the right-hand grid and cutting off the right-hand triode. The left-hand anode also impresses a negative pulse through condensers 142 and 147 to the grids of tube 18. The left-hand triode of tube 18 being already cut off, the negative impulse applied to its grid has no effect, but the right-hand grid is carried negative to an extent that cuts off the right-hand triode, whereupon the right-hand anode swings toward positive, carrying with it the grid of the left-hand triode and rendering the left-hand triode conductive. In like manner the left-hand anode of tube 13 swings toward negative, impressing the negative impulse through condensers 152 and 157 on the grids of tube 19, to cut off the right-hand triode which in turn renders the left-hand triode conductive. This, as a result of a single positive impulse applied by the left-hand anode of tube 16 to the left-hand grid of tube 17 the condition of conductivity of the three tubes 17, 18 and 19 has been reversed and the left-hand triodes are now conductive.

Attention is now directed to connections from the right-hand grids of tubes 17, 18 and 19 through resistors 161, 162 and 163 respectively to conductor 164 from which a path is traced through conductor 93 to the grid of the left-hand triode of tube 16. A cut-off potential is applied through this path to the grid of the left-hand triode of tube 16 when the right-hand triode of any one or more of the three counting tubes 17, 18 and 19 is cut off. It may be stated conversely that the left-hand triode of tube 16 can conduct only when the right-hand triodes of all three of the counting tubes 17, 18 and 19 are conductive. This circuit arrangement provides an important feature of the invention. It should be remembered that the cutting off of the right-hand triode of tube 11 in response to the start impulse of spacing nature caused the activation of the right-hand triode of tube 16, which in turn caused the cutting off of the left-hand triode of tube 15, which in turn caused the starting of the oscillator including the right-hand triode of tube 15, which caused the production of a pulse at the end of the first half cycle that momentarily activated the left-hand triode of tube 13, which in turn cut off the left-hand triode of tube 16, which in turn produced the positive pulse that effected the reversal of the three stages of the counting circuit comprising tubes 17, 18 and 19, which in turn prevented the restoration of conductivity in the left-hand triode of tube 16 at the end of the momentary conductivity of the left-hand triode in tube 13, the left-hand triode of tube 16 remaining non-conductive and holding the right-hand triode conductive to prevent the stopping of the oscillator. Had the spacing condition to which the right-hand triode of tube 11 responded been a hit or other disturbance having a duration of less than one-half cycle of the oscillator, which is the same as one-half the interval of a correctly timed telegraph impulse, the right-hand triode of tube 16 would have been restored to conductivity at the end of the short spacing hit or disturbance, to render the left-hand triode of tube 15 again conductive and stop the oscillator. The repeater is not committed to a full cycle of operation (the duration of a complete character) until the counting circuit has been stepped off normal and this occurs only as a result of the first positive swing of the right-hand anode of tube 14 an interval equal to one-half the length of a telegraph impulse after the starting of the oscillator. Hits or spacing disturbances having a shorter duration merely result in the starting of the oscillator and the stopping of the oscillator after not more than one-half cycle (duration of one-half a dot length) with the entire repeater restored to idle condition.

At the end of the second half cycle of the oscillator, which coincides with the theoretically correct time for the end of the incoming start impulse and coincides with the center of the retransmitted start impulse the right-hand triode of tube 14 returns to full conductivity, impressing, from its anode, a negative pulse over conductor 81 to and through condensers 136 and 138, the pulse through condenser 136 being extended through resistor 137, the parallel-connected resistor 128 and condenser 131, and resistor 129 to the right-hand grid of tube 17, and the pulse through condenser 138 being extended through resistor 139, the parallel-connected resistor 135 and condenser 134, and resistor 133 to the left-hand grid of tube 17. The impulse has no effect on the right-hand triode but the negative swing of the left-hand grid in response to the negative impulse cuts off the left-hand triode, swinging the left-hand anode toward positive and with it the grid of the right-hand triode so that the latter triode becomes conductive. A positive impulse is applied from the left-hand anode and through condensers 142 and 147 to the grids of tube 18 but positive impulses will not reverse this tube so that the condition of the tube 18 remains unchanged and since tube 19 may be driven only from tube 18, it also remains unchanged. Before, concurrently with or after the end of the second half cycle, depending upon whether the incoming signals are perfect or distorted, and in the case of distortion, whether the transition to the first significant impulse of the code combination is advanced or delayed, assuming that the first impulse is of marking nature and that there is a transition, receiving conductor 21 will return to marking condition, swinging the right-hand grid of tube 11 toward positive and rendering the right-hand triode conductive. This reverses the condition of the grids of tube 13, the left-hand triode now being biased far beyond cut-off and tht right-hand triode being biased only slightly beyond cut-off. The right-hand triode of tube 16 remains conductive because that triode is dominated by the left-hand triode, and cannot be cut off through conductor 29′ and resistor 33.

At the end of the third half cycle of the oscillator the right-hand triode of tube 14 cuts off, its anode swings toward positive, the positive impulse is impressed through condensers 83 and 84 on the grids of tube 13 and the right-hand triode is rendered conductive momentarily. The right-hand anode swings toward negative and impresses a negative pulse through resistor 166, condenser 167 and resistor 102 on the right-hand grid of tube 12. The right-hand triode of tube 12 cuts off, its anode swinging toward positive and carrying with it the grid of the left-hand triode and also the grid of the left-hand triode of tube 11. The left-hand triode of tube 12 becomes conductive by virtue of the flip-flop action and the left-hand triode of tube 11 becomes conductive to reestablish the marking condition on transmitting conductor 113.

At the end of the fourth half cycle of the oscillator the right-hand triode of tube 14 becomes conductive and its anode swings negative, applying a negative pulse through condensers 136 and 138 to the grids of tube 17. This impulse cuts off the right-hand triode which restores conductivity to the left-hand triode. The anode of the left-hand triode swings negative and impresses a negative pulse through condensers 142 and 147 to the grids of tube 18. The left-hand triode of this tube cuts off and restores conductivity to the right-hand triode. As the left-hand triode of tube 18 cuts off its anode swings toward positive and impresses a positive pulse through condensers 152 and 157 on the grids of tube 19. Positive pulses do not change the conductivity condition of the tube so that it remains with the left-hand triode conducting and the right-hand triode cut off.

At the end of the fifth half cycle of the oscillator a positive pulse is again applied to the grids of tube 13. Assuming that the second significant impulse of the code combination, to which the repeater is now responding, is of spacing nature, the left-hand triode of tube 13 will become conductive momentarily, to cut off the left-hand triode of tube 12 and render the right-hand triode conductive, thereby to cut off the left-hand triode of tube 11 and effect the retransmission of a spacing signal.

At the end of the sixth half cycle the conductivity condition of tube 17 is again reversed by the right-hand triode of tube 14, the left-hand triode being cut off and the right-hand triode being rendered conductive. The positive pulse impressed upon the grids of tube 18 due to the cutting off of the left-hand triode of tube 17 effects no change in the condition of tube 18.

At the end of the seventh half cycle of the oscillator the right-hand triode of tube 14 again impresses a positive pulse on the grids of tube 13. Assuming that the third impulse, now being received, is of marking nature the right-hand triode of tube 13 will be rendered conductive momentarily, to cut off the right-hand triode of tube 12 and restore conductivity to its left-hand triode, thereby restoring conductivity to the left-hand triode of tube 11 to effect the retransmission of a marking impulse.

At the end of the eighth half cycle of the oscillator a negative pulse is again impressed on the grids of tube 17 by the right-hand triode of tube 14, reversing tube 17, by cutting off the right-hand triode and restoring conductivity to the left-hand triode. The left-hand triode impresses a negative pulse on the grids of tube 18 which reverses, the right-hand triode cutting off and the left-hand triode becoming conductive. The left-hand anode of tube 18 impresses a negative pulse through condensers 152 and 157 on the grids of tube 19, reversing the conductivity of that tube, the left-hand triode cutting off and the right-hand triode becoming conductive.

At the end of the ninth half cycle, which occurs at theoretically correct time for the center of the received fourth significant impulse the right-hand triode of tube 14 again impresses the positive pulse on the grids of tube 13. Assuming that the fourth significant impulse of the code combination is of the same condition as the third significant impulse, namely marking, the right-hand triode of tube 13 will be rendered conductive momentarily. Since both halves of tube 12 and the left-hand triode of tube 11 are conditioned for the retransmission of a marking impulse no change will occur in these tubes.

At the end of the tenth half cycle of the oscillator the grids of tube 17 again receive a negative pulse from the right-hand anode of tube 14. This negative pulse cuts off the left-hand triode and restores conductivity to the right-hand triode. The positive pulse impressed upon the grids of tube 18 does not change the condition of that tube.

At the end of the eleventh half cycle of the oscillator a positive pulse is again impressed upon the grids of tube 13. Assuming that the telegraph impulse now being received, which is the fifth significant impulse, is of spacing nature the left-hand triode of tube 13 will be rendered conductive momentarily to cut off the left-hand triode of tube 12, restore conductivity to the right-hand triode and thereby cut off the left-hand triode of tube 11, to initiate retransmission of the spacing impulse.

At the end of the twelfth half cycle of the oscillator the right-hand anode of tube 14 impresses a negative pulse on the grids of tube 17, cutting off the right-hand triode and rendering the left-hand triode conductive. The negative pulse impressed upon the grids of tube 18 reverses that tube, the left-hand triode being cut off and the right-hand triode being rendered conductive. The positive pulse applied by the left-hand anode of tube 18 to the grids of tube 19 does not change the condition of that tube and tubes 18 and 19 are now in the condition which was described as the normal or idle condition, the right-hand triodes being conductive and their left-hand triodes being non-conductive. Tube 17 is not in its normal condition however, because its left-hand triode is conductive and the right-hand triode is cut off.

At the end of the thirteenth half cycle of the oscillator the grids of tube 13 again receive a positive pulse from the right-hand anode of tube 14. The input circuit of the receiver should now be in marking condition in response to the stop impulse, and assuming this condition, with the right-hand triode of tube 11 conductive, the right-hand triode of tube 13 will be rendered conductive momentarily to cut off the right-hand triode of tube 12 and restore conductivity to the left-hand triodes of tubes 12 and 11 thereby initiating retransmission of the marking stop impulse.

At the end of the fourteenth half cycle of the oscillator the right-hand triode of tube 14 again reverses tube 17, cutting off the left-hand triode and rendering the right-hand triode conductive. The positive pulse from the left-hand anode does not change the condition of tube 18. With this reversal of tube 17, the three counting tubes are now in their normal or idle condition, with their left-hand triodes cut off and right-hand triodes conductive.

With the left-hand triodes of the tubes 17, 18 and 19 cut off and the right-hand grids of those tubes thereby swung toward positive the potentials applied through resistors 161, 162 and 163 result in a positive voltage swing applied over conductors 164 and 93 to the grid of the left-hand triode of tube 16, rendering that triode conductive. The left-hand anode of tube 16 swings toward negative, carrying with it the right-hand grid of the tube and the right-hand triode cuts off. As a result of this the right-hand anode of tube 16 swings toward positive, carrying with it the left-hand grids of tubes 15 and 14, rendering the left-hand triodes of those tubes conductive. The low resistance of the left-hand triode of tube 15 in the conducting condition damps out any possibility of oscillation in the oscillator circuit and accordingly the oscillator stops. The oscillator circuit is critically damped and it stops substantially without transients. All of the tubes of the repeater are now in the initial or normal condition, awaiting response of the right-hand triode of tube 11 to the start impulse of the next code combination.

The stopping of the oscillator as described in the foregoing paragraph is predicated upon the assumption that the right-hand triode of tube 11 is conducting, due to reception of the stop impulse, at the time that the left-hand triodes of tubes 17, 18 and 19 are cut off. In the event that the repeater is not receiving a marking condition at that time, but instead is responding to a spacing signal, as will be the case when a prolonged spacing condition, sometimes called a break signal, is received by the repeater, the right-hand triode of tube 11 will not have returned to conductivity but will remain cut off. With the right-hand triode of tube 11 remaining cut off, the right-hand triode of tube 16 cannot be cut off by the left-hand triode of that tube when the latter triode is rendered conductive upon the return of tubes 17, 18 and 19 to their initial condition. The right-hand triode of tube 16 can be cut off only when the left-hand triode of tube 16 and the right-hand triode of tube 11 are both conductive. Since the right-hand triode of tube 11 prevents the cutting off of the right-hand triode of tube 16, the left-hand triode of tube 15 cannot be rendered conductive to stop the oscillator comprising the right-hand triode of tube 15 and the oscillator will continue to oscillate. As the oscillator continues in operation, it causes the right-hand triode of tube 14 to produce pulses that are applied to the counting circuit comprising tubes 17, 18 and 19, causing the counting circuit to move out of initial or normal condition and to enter upon another counting cycle. As long as the received spacing condition exists, the left-hand triode of tube 16 cannot cut off the right-hand triode, the oscillator will continue to oscillate and successive cycles of the counting circuit comprising tubes 17, 18 and 19 will be initiated. At the end of the prolonged spacing signal, conductivity is restored to the right-hand triode of tube 11, which qualifies the right-hand triode of tube 16 to be cut off by the left-hand triode of that tube when the counting circuit completes the cycle in progress at the time the prolonged spacing signal ends. Upon completion of the counting cycle, tubes 17, 18 and 19 jointly render the left-hand triode of tube 16 conductive and that triode cuts off the right-hand triode of the same tube, which renders the left-hand triode of tube 15 conductive to stop the oscillator and maintain the repeater in the initial or normal condition, awaiting response of the right-hand triode of tube 11 to the start impulse of the next code combination, as previously described.

No function has yet been described for the left-hand triode of tube 14. This tube has its grid connected to the grid of oscillator stop control triode, which is the left-hand triode of tube 15 and accordingly conducts when the oscillator stop control tube is conducting and preventing operation of the oscillator. The anode load resistor for the left-hand triode of tube 14 is common to that of the left-hand triode of tube 12 and is the resistor 99.

Under certain circumstances, such as battery hits or line hits, and in the case of hand Morse sending and supervisory signaling where marking and spacing impulses do not have a definite relation to start-stop permutation code character timing, and it is still desirable to transmit such signals as well as possible, a condition might be reached where the output was steadily spacing while the input was steadily marking. This could occur if a spacing condition was being received at about the end of the thirteenth half cycle of the oscillator, when a positive pulse is applied to the grids of tube 13, and during the fourteenth half cycle the input should change to a marking condition and remain in that condition. The oscillator would be stopped at the end of the fourteenth half cycle without the generation of any more timing pulses by which the marking condition could be retransmitted to the outgoing conductor 113. With the left-hand triode of tube 14 rendered conductive along with that of tube 15, and the discharge current flowing through load resistor 99 the left-hand anode of tube 14 swings negative, carrying with it the right-hand grid of tube 12 so as to cut off that tube. The cutting off of the right-hand triode of tube 12 swings the grid of the left-hand triode of tube 11 toward positive thereby causing it to conduct and transmit a marking condition on conductor 13. With this arrangement the output of the repeater cannot be of spacing nature when the oscillator is stopped.

The resistors and the condensers associated with the several switch banks of selector switch 58 determine the frequency of the oscillator circuit. Printing telegraph transmitters and receivers are usually arranged to operate at one of several speeds which may be considered as standardized, speeds of sixty words per minute, seventy-five words per minute and one hundred words per minute being examples of such speeds. In order for the regenerative repeater disclosed herein to be adapted for use in systems which operate at these speeds, it is desirable to be able to switch from one to another of the speeds. The combination of switch 58 and the associated resistors and condensers provides for changing the frequency of the oscillator so that for each position of the switch the time interval occupied by one cycle of the oscillator is equal to the interval occupied by a start impulse or significant code impulse at one of the standard printing telegraph operating speeds.

Reference was made in the foregoing paragraph to the interval of start and significant impulses of the telegraph code. The stop impulse was not mentioned because in some systems employing automatic or machine transmission, in which the stop impulses are of fixed length, as contrasted with manual or keyboard sending, in which the duration of the stop impulse is dependent upon the keyboard techniques of operators, the stop impulse is longer than the start or significant impulses, bearing a relation to them of 1.42. The repeater hereinbefore described accommodates code combinations having stop impulses of this type, because, having initiated the retransmission of a stop impulse, whether in the normal manner or by operation of the left-hand triode of tube 14, the retransmission of the stop impulse is sustained until a start impulse is received.

The jack 52 is provided for the insertion of a milliammeter in the anode circuit of the left-hand triode of tube 15 and variable resistor 53 is provided for adjusting the current of this tube to a desired value. There is an optimum value of current through the left-hand triode of tube 15 and the inductance 61 for starting the oscillator, when the left-hand triode of tube 15 is cut off, slightly ahead of or negative with respect to the beginning of a positive half cycle. Jack 52 and resistor 53 provide for adjusting and measuring the oscillator stop current. Adjustable resistor 74 is included in the cathode circuit of the right-hand triode of tube 15 and controls the oscillation-sustaining feedback from the lower to the upper portion of inductance 61 and provides for adjusting the feedback so that within an operating cycle of the repeater, which involves seven cycles of the oscillator, the amplitude of oscillation shall neither increase nor decrease appreciably.

As is now apparent, the repeater circuit shown in Fig. 1 is adapted to operate in response to start-stop permutation code signals of a five-unit code, the number of units being the number of significant or selecting impulses of the code combination. For some purposes the five-unit code does not afford a sufficient number of selective possibilities and a six-unit code is employed. Fig. 1A shows an adjunct for the counting circuit of Fig. 1 which is connectable to that counting circuit by means of five conductors to enable the repeater to regeneratively repeat six-unit code signals without any other change. Fig. 1A comprises a twin triode vacuum tube similar to the tubes 17, 18 and 19 and identified by the reference numeral 171. The left-hand anode of the tube is connectable to the positive terminal of battery 78. The right-hand anode is connectable to the left-hand anode of tube 17. The left-hand grid is connectable through resistor 172 to a point which is negative with respect to ground by a potential furnished by the potential divider comprising resistors 106 and 107. The grid is also connectable through condenser 173 and resistor 174 to conductor 117 which extends to the left-hand anode of tube 16. A cathode follower control of the grid of the right-hand triode of tube 171 by the left-hand triode is provided by a connection from the left-hand cathode through resistors 176 and 177 to the negative terminal of battery 178, with the right-hand grid connected to the junction of those resistors. A timing factor is provided by a connection from the left-hand cathode of tube 171 through condenser 179 to ground.

In the idle condition of the repeater with the circuit of Fig. 1A connected thereto, the cathode of the left section of tube 171 is at a sufficiently negative potential to cut off the right section by virtue of the left cathode to right grid connection through resistor 176. When the left-hand triode of tube 16 cuts off at substantially the end of the first half cycle of the oscillator, in the manner previously described, and impresses a positive pulse on the left-hand grid of tube 17 to reverse the three tubes 17, 18 and 19, it also impresses a positive pulse on the left-hand grid of tube 171 to cause the cathode of this triode to become positive. The left-hand triode provides a low impedance path for the charging of condenser 179, which quickly charges to the potential of the left-hand cathode. The charge on condenser 179 is positive with respect to ground and accordingly a positive potential is applied to the grid of the right-hand triode of tube 171 causing that triode to conduct also. The time constant of condenser 179 and resistors 176 and 177 is such that the charge will have leaked off condenser 179 to an extent that the right-hand triode of tube 171 cuts off before the end of the fourth half cycle of the oscillator but not before the end of the second half cycle.

At the end of the second half cycle the right-hand triode of tube 14 applies a negative pulse to the grids of tube 17 as previously described. This negative pulse seeks to cut off the left-hand triode of tube 17 whereby the right-hand triode would be rendered conductive. However, the potential difference across resistor 126 due to the anode current of the right-hand triode of tube 171 holds the grid of the right-hand triode of tube 17 at cut-off so that the right-hand triode cannot become conductive. After the negative pulse applied through condenser 138 to the grid of the left-hand triode of tube 17 has been dissipated the left-hand triode of tube 17 will resume conductivity, and the net result is that tube 171 has rendered the counting circuit insensitive to the first negative pulse which that counting circuit would otherwise have counted.

Before the end of the fourth half cycle of the oscillator the condenser 179 discharges sufficiently to cut off tube 171 and tube 17 is rendered fully responsive to the negative pulses generated by the right-hand triode of tube 14. Upon the occurrence of the seventh negative pulse following the cutting off of tube 171 the counting circuit will operate to stop the oscillator and restore the repeater to the normal or idle condition in the manner hereinbefore described. The counting circuit will have counted its full allotment of seven negative pulses, representing seven cycles of the oscillator but it was prevented from counting the first negative pulse so that the oscillator will have operated for eight instead of seven cycles, the eight cycles accommodating regenerative retransmission of the start impulse, six significant code impulses, and the initiation of the stop impulse.

Figure 3:
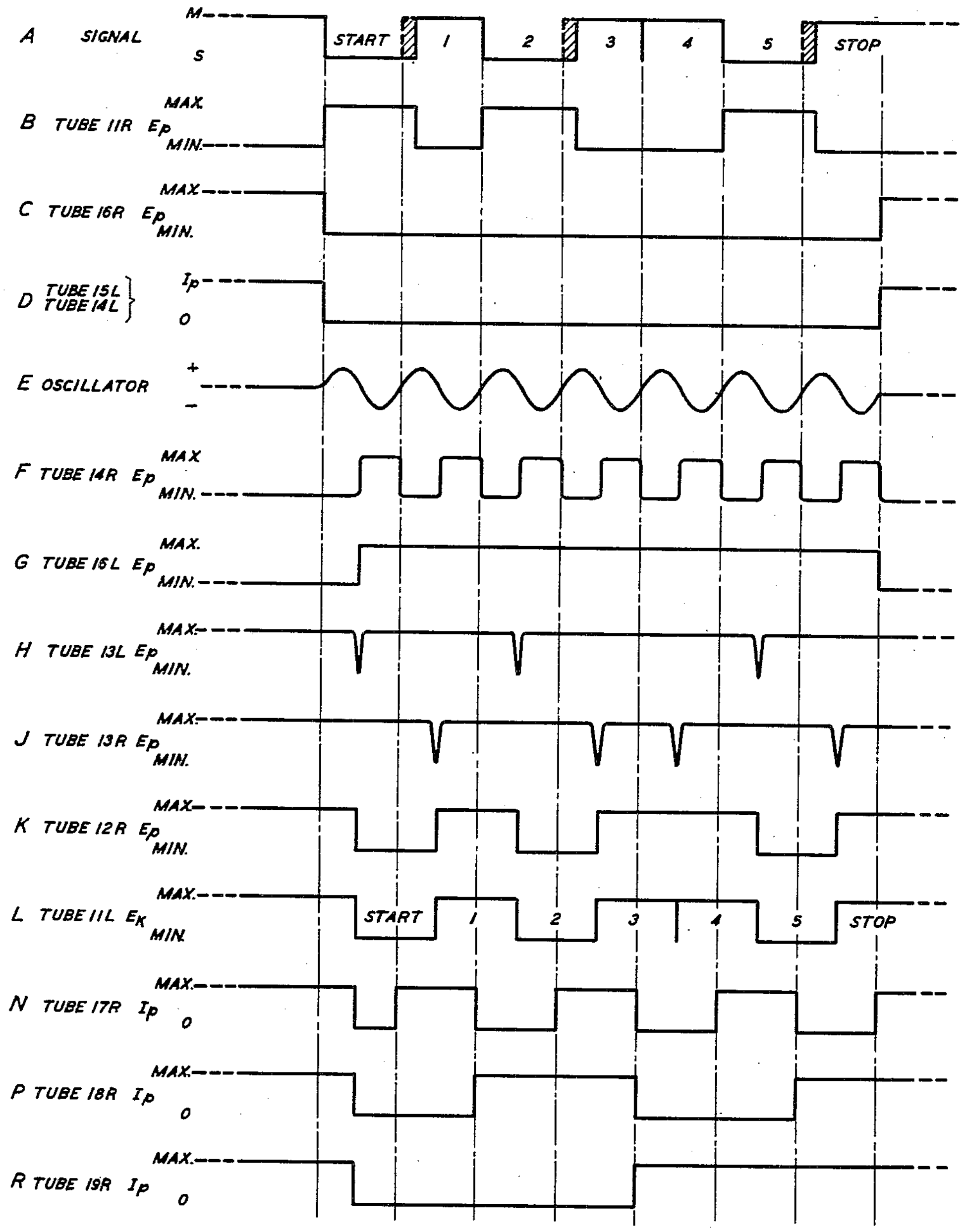
Fig. 3 is a set of timing graphs or charts.

Fig. 3 is a set of curves or graphs representing the operation of the repeater shown in Fig. 1 in receiving a code combination. Curve A represents a code combination impressed upon the input of the repeater and is the code combination for the letter "F," this being the code combination upon which the foregoing detailed description of operation was predicated. The code combination is shown as having been affected by spacing bias, which is a form of distortion characterized by delayed occurrence of the space-to-mark transitions relative to the beginning of the start impulse. The shaded areas represent the extent of the delay in the space-to-mark transitions.

Graph B represents the plate voltage in the right-hand triode of tube 11. This tube is cut off during the spacing impulses and conducts during the marking impulses. It will be noted that the spacing bias produces an elongation of the spacing impulses at the expense of the immediately following marking impulses.

Graph C represents the plate voltage in the right-hand triode of tube 16 which is normally cut off and becomes conductive substantially in concurrence with the start impulse transition.

Graph D represents the plate current in the left-hand triodes of tubes 14 and 15 which are cut off in unison by virtue of the flow of anode current in the right-hand triode of tube 16. Plate current rather than plate voltage has been indicated because the plate potentials vary under the influence of other circuit elements to which they are connected; in the case of the left-hand anode of tube 14 the connection is to the left-hand anode of tube 12, and in the case of the left-hand anode of tube 15 the connection is to the oscillator. The significant feature is that these triodes receive cut-off potentials on their grids.

Graph E represents the oscillator voltage at the cathode of the right-hand triode of tube 15 and at the grid of the right-hand triode of tube 14.

Graph F represents the plate voltage in the right-hand triode of tube 14, this triode being normally conductive in the idle condition of the repeater and during positive half cycles of the oscillator and being cut off during the negative half cycles, the plate voltage wave, which would be the inverse of the current wave of graph F, approaching a square wave.

Graph G represents the plate voltage of the left-hand triode of tube 16.

Graphs H and J represent the plate voltages in the left and right-hand triodes, respectively, of tube 13 for initiating the retransmission of spacing or marking impulses, respectively.

Graph K represents the plate voltage in the right-hand triode of tube 12 and graph L represents the cathode voltage in the left-hand triode of tube 11. The latter triode conducts in unison with the left-hand triode of tube 12, the conductive intervals representing retransmitted marking impulses and the non-conductive intervals representing retransmitted spacing impulses. By comparing graph L with graph A, it will be observed that the beginning of the retransmitted start impulse coincides with the theoretically correct center of the received start impulse and that succeeding transitions occur in multiples of unit intervals thereafter. It will also be noted that the spacing bias has been eliminated in the repeating process and that correct selection of the signaling impulse conditions will be made providing the distortion on the incoming signal does not exceed about 50 percent of a correct impulse length.

Graphs N, P and R represent the plate current in the right-hand triode of tubes 17, 18 and 19, respectively. Since the plate current in the other half of each tube is merely an inversion of that shown in graphs N, P and R, it is considered unneecssary to represent those plate currents by graphs also. The previously described plate current transitions in tube 17 substantially at the ends of the first and second half cycles and subsequent transitions at the end of even half cycles is clearly evident in graph N. Also, the concurrence of the initial conditions of the three tubes only at the end of the seventh cycle of the oscillator is evident from a comparison of graphs N, P and R.

Figure 2:
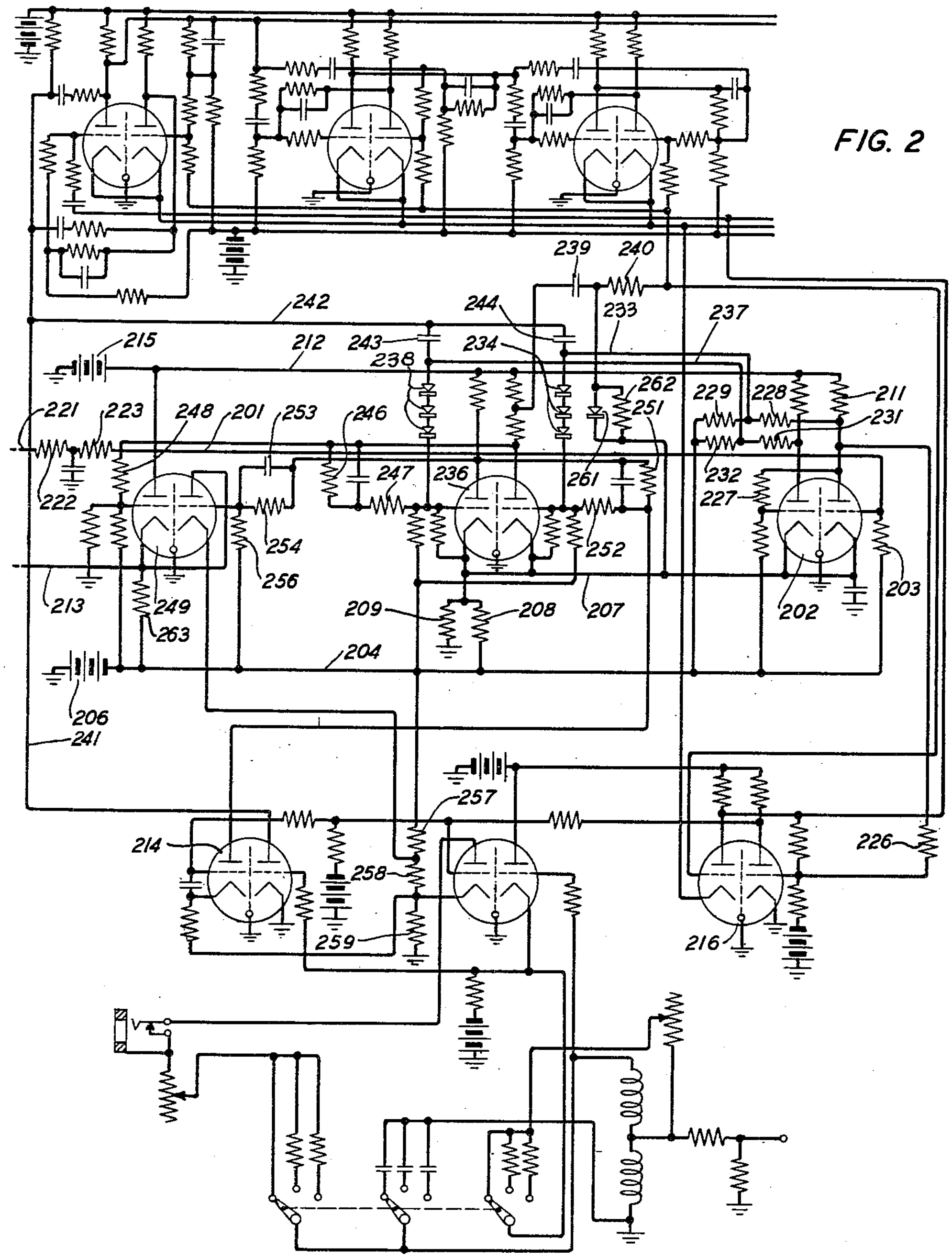
Fig. 2 is a schematic circuit showing another embodiment of the electronic regenerative repeater.

Another embodiment of the repeater is shown in Fig. 2, which differs from that of Fig. 1 principally in the receiving, modulating, selecting and retransmitting circuits, these circuits being comprised of tubes 11, 12 and 13 in Fig. 1. The timing and counting circuits of Fig. 2 differ from those of Fig. 1 only in minor modification of voltage supply circuits, including potentiometer and other resistor arrangements which do not result in a different mode of operation of the timing and counting circuits.

The retransmitting instrumentality in Fig. 1 is the left-hand triode of tube 11, which cuts off to apply a negative potential to conductor 113 for mark-to-space transitions, and is restored to conductivity to apply a positive potential to conductor 113 for space-to-mark transitions. Lines to which transmitting conductor 113 may be connected may be numerous and lengthy and may involve considerable shunting capacitive reactance. The retransmission of signals involves charging this capacitance positively and negatively for the marking and spacing signals. For the marking signals the line capacitance is charged through the relatively low impedance of the left-hand triode of tube 11. For the spacing impulse the triode is cut off and the current for discharging and recharging the capacitance of the line must flow in the potential divider comprising resistors 111 and 112, which may represent a considerably higher impedance than that of the left-hand triode of tube 11 when conductive. These unequal impedances may impart deformity to the perfect signals which the repeater is capable of supplying for retransmission. The arrangement shown in Fig. 2 may be employed when the retransmitting system involves high capacitance, in order to avoid degradation of the signals.

Receiving conductor 221 is connected through resistors 222 and 223 and conductor 201 to the grid of the right-hand triode of tube 202, from which a path is also traced through resistor 203 and conductor 204 to the negative terminal of battery 206. The positive potential on receiving conductor 221 for the idle or marking condition causes the right-hand triode of tube 202 to be conducting. When a spacing impulse is impressed upon receiving conductor 221, such as the start impulse of a code combination, the right-hand triode of tube 202 cuts off. This triode has its cathode connected through conductor 207 to the junction of resistors 208 and 209 connected in series between the negative terminal of battery 206 and ground. The anode of the right-hand triode of tube 202 is connected through load resistor 211 and conductor 212 to the positive terminal of battery 215.

The right-hand anode of tube 202 is connected through resistor 226 to the grid of the right-hand triode of tube 216, which corresponds with tube 16 of Fig. 1. With the right-hand triode of tube 202 cut off its anode swings toward positive, carrying with it the grid of the right-hand triode of tube 216 and rendering that triode conducting. In the arrangement shown in Fig. 1 the activation of the right-hand triode of tube 16 was accomplished from the right-hand triode of tube 11. The anode of the right-hand triode of tube 202 is also connected through resistor 227 to the grid of the left-hand triode. Accordingly, the left-hand triode of tube 202 is rendered conductive when the right-hand triode is cut off, and it follows from this that in the normal or idle condition of the repeater the left-hand triode is cut off and the right-hand triode is conducting.

The right- and left-hand anodes of tube 202 are connected respectively through resistors 228 and 229 in series and 231 and 232 in series and through conductor 204 to the negative terminal of battery 206. From the junction of resistors 228 and 229 a connection is taken through conductor 233 and unidirectional current conducting devices or diodes 234 to the grid of the right-hand triode of tube 236. Similarly, a connection is taken from the junction of resistors 231 and 232 through conductor 237 and unidirectional current conducting devices or diodes 238 to the grid of the left-hand triode of tube 236. There is also a connection for impressing positive pulses upon the grids of tube 236 from the right-hand anode of tube 214, which corresponds to tube 14, in Fig. 1, through conductors 241 and 242 and condensers 243 and 244 to the unidirectional conducting devices 238 and 234, respectively.

It will be remembered that at the theoretically correct center of the incoming start impulse and each code impulse, the right-hand anode of tube 14 swings sharply towards positive under the control of the oscillator. The same is true of the right-hand anode of tube 214 in Fig. 2 and accordingly positive timing pulses are impressed through condensers 243 and 244 on the unidirectional current conducting devices.

With the right-hand triode of tube 202 cut off and the left-hand triode conducting in response to the start impulse of the code combination, the junction of condenser 243 and unidirectional conducting devices 238 is carried toward negative and the junction of condenser 244 and the unidirectional current-carrying devices 234 is carried toward positive. When the positive timing pulse is applied through condensers 243 and 244 a high negative bias applied to the unidirectional conducting devices 238 from the left-hand anode of tube 202 prevents the positive pulse from being transmitted through to the left-hand grid of tube 236. No such negative bias is applied to the unidirectional conducting devices 234 so that the positive pulse impressed on condenser 244 reaches the right-hand grid of tube 236. The right-hand triode of tube 236 is rendered conductive and by virtue of a connection from the right-hand anode through resistors 246 and 247 to the left-hand grid of tube 236 the left-hand triode of that tube is cut off, and by virtue of a similar connection from the right-hand anode of tube 236 through resistor 248 to the left-hand grid of tube 249 the conductivity of the left-hand triode of that tube is reduced but not cut off. The anode of the left-hand triode of tube 236, which swings toward positive when the left-hand triode is cut off, is connected through resistors 251 and 252 to the right-hand grid of tube 236. From this it will be apparent that the two triodes of tube 236 are interconnected in a flip-flop circuit, and that with the cutting off of current in the left-hand triode the anode thereof swings toward positive, carrying with it the right-hand grid to hold the right-hand triode conductive after the positive pulse impressed on the right-hand grid through condenser 244 has been dissipated, and until the left-hand triode shall again be rendered conductive.

There is also a connection from the left-hand anode of tube 236 through resistor 254 shunted by condenser 253 to the grid of the right-hand triode of tube 249. This grid has its return connected through resistor 256 and conductor 204 to negative battery 206. The right-hand cathode is returned to a point which is positive with respect to conductor 204 by the potential difference across a resistor 257 which is connected in series with resistors 258 and 259, between negative battery conductor 204 and ground. Thus the grid of the right-hand triode of tube 249 is normally negative with respect to the cathode and the triode is cut off. The right-hand anode of tube 249 is connected directly to the left-hand cathode of tube 249, to which is also connected the outgoing or transmitting conductor 213, and the cathode is returned to the negative terminal of battery 206 through cathode load resistor 263. The left-hand triode of tube 249 has no anode load resistor, its anode being connected to the positive terminal of battery 215.

Upon the reversal of tube 236 as previously described, the conductivity of the left-hand triode of tube 249 is reduced and the right-hand triode is rendered conductive by virtue of the positive swing applied through resistor 254 to its grid from the anode of the left-hand triode of tube 236. The potential which the grid of the left-hand triode of tube 249 receives from the right-hand anode of tube 236 for the retransmission of a spacing impulse is such as to decrease the current through the left-hand triode of tube 249 and provide a potential difference across resistor 263 which carries the left-hand cathode of the tube and transmitting conductor 213 negative with respect to ground by the desired amount.

The potential which the right-hand grid of tube 249 receives from the left-hand anode of tube 236 during the transmission of a spacing impulse is such as to cause the right-hand triode of tube 249 to conduct. Condenser 253 connected in parallel with resistor 254 provides a surge path to the right-hand grid of tube 249 so that at the instant of the transition from marking to spacing, the right-hand triode of tube 249 shall be considerably more conductive.

The right-hand triode of tube 249, having its anode connected to the left-hand cathode, and having its cathode returned to a point between ground and the negative terminal of battery 206, provides a low impedance path for discharging the capacitance of circuits connected to transmitting conductor 213. Instead of discharging and reversely charging that capacitance through resistor 263, which might prolong the transition of the sending conductor from the marking to the spacing potential, the capacitance is discharged and reversely charged through the very much lower impedance of the right-hand triode of tube 249 in the conductive condition thereof, so that the transition from marking to spacing may be almost instantaneous and the beginning of the impulse is not distorted.

Assuming that the first significant impulse of the code combination is of marking nature the receiving conductor 221 returns to the marking condition, reactivating the right-hand triode of tube 202 and thereby swinging its anode toward negative, cutting off the left-hand triode of tube 202, thereby swinging its anode toward positive. These anode potentials are effective through conductors 233 and 237 to prepare for the activation of the left-hand triode of tube 236. Upon the production of a positive timing pulse by the right-hand anode of tube 214 this pulse is impressed through condensers 243 and 244, to render the left-hand triode of tube 236 conductive, whereby the right-hand triode is cut off. The left-hand triode of tube 236 cuts off the right-hand triode of tube 249 and the right-hand triode of tube 236 restores the left-hand triode of tube 249 to full conductivity. With the increased anode current through the left-hand triode of tube 249 the potential difference across the cathode load resistor 263 is increased to restore the positive marking potential on transmitting conductor 213. Prior to the transition from spacing to marking, the capacitance of the circuits connected to output conductor 213 has been charged negatively. This capacitance must discharge to ground and recharge in the positive direction, and the anode-cathode discharge path of the left-hand triode of tube 249 provides a low impedance path for quickly discharging and recharging the circuit capacitance so that the transition from spacing to marking shall occur almost instantaneously. Tube 249 is so connected and operated in the circuit that the right- and left-hand triodes of tube 249 provide equal impedance paths for discharging and recharging the capacitance for mark-to-space and space-to-mark transitions, respectively, and these impedances are such that the transitions are equally sharp so that the retransmitted signals are substantially without telegraph bias.

It should be noted with reference to the arrangement shown in Fig. 2 that the grid of the left-hand triode of tube 216 received a negative pulse for cutting off that triode, thereby to impress a positive pulse on the grid of the left-hand triode of the first counting tube to step the counting system off normal, from the right-hand anode of tube 236 through condenser 239 and resistor 240. Whereas the left-hand triode of tube 13 in Fig. 1, from the anode of which the left-hand grid of tube 16 receives its negative pulse through condenser 91 and resistor 92, is conductive only momentarily, the right-hand triode of tube 236 conducts for the full interval of each spacing impulse. This interval may be sufficient for the transient pulse through condenser 239 to become dissipated, and for the condenser and also the grid of the left-hand triode of tube 216 to return to their steady-state condition. This would be particularly true in the case of a succession of spacing impulses. Upon the cutting off of the right-hand triode of tube 236 for a space-to-mark transition after an interval of one or more impulses following a space-to-mark transition, the right hand triode of tube 236 cuts off and impresses a positive pulse on condenser 239. Such a pulse, if permitted to reach the left-hand grid of tube 216, might result in the reactivation of that tube in spite of the fact that the three counting stages had not returned to their normal condition to provide for activation of the left-hand triode of tube, as described in connection with tube 16 of Fig. 1. In order that the positive pulses impressed on condenser 239 shall not reach the left-hand grid of tube 216, these pulses are diverted away from the left-hand grid of tube 216 by unidirectional current conducting device or diode 261 shunted by resistor 262. The unidirectional current conducting device 261 presents a low impedance to positive pulses impressed on condenser 239 but a high impedance to negative pulses, and although a negative pulse is applied through condenser 239 to the left-hand grid of tube 216 for each mark-to-space transition, this tube remains cut off by the counting circuit after that circuit has stepped off normal so that the remaining negative pulses have no effect on the left-hand triode of tube 216.

The operation of the repeater proceeds for the several significant impulses of the code combination, the right-hand triode of tube 236 being rendered conductive for the spacing impulses, and the left-hand triode of that tube being rendered conductive for the marking impulses. Under the control of tube 236, conductivity of the left-hand triode of tube 249 is reduced and the right-hand triode is rendered conductive for the spacing impulses, the conductivity of the left-hand triode is restored and the right-hand triode is cut off for the marking impulses. One-half cycle of the oscillator after each positive pulse is impressed upon condensers 243 and 244 by the right-hand anode of tube 214 that anode impresses a negative pulse on the grids of the first triode of the counting circuit to step that circuit. One-half cycle after the positive pulse for the stop impulse is impressed on condensers 243 and 244 the negative pulse restores the counting circuit to its original condition, thereby reactivating the left-hand triode of tube 216, which controls the right-hand triode and also the tube 214 and the start-stop oscillator in the manner described with reference to the control of tubes 14 and 15 by the left-hand triode of tube 16 in Fig. 1, and the entire repeater is restored to its idle condition. The left-hand anode of tube 214 is associated with the right-hand grid of tube 236 and draws current through the load resistor for the left-hand triode so as to effect the same control that the left-hand triode of tube 14 in Fig. 1 effects, namely, that the output conductor 213 cannot be in the spacing condition when the timing oscillator is stopped under the control of its stop circuit. This is accomplished by causing the left-hand triode of tube 214, when conductive, to cut off the right-hand triode of tube 236, which is the condition of that tube for retransmission of a marking impulse and will cause the left-hand triode of tube 249 to be at full conductivity.

Although certain specific embodiments of the invention have been shown in the drawings and described in the foregoing specification it will be understood that the invention is not limited to these specific embodiments but is capable of modification and rearrangement without departing from the spirit of the invention and within the scope of the appended claims.

What is claimed is:

1. In a telegraph signal responsive circuit, normally dormant means for generating a time base, means responsive to a received signaling condition having a predetermined characteristic for activating said time base generating means, and means whereby said time base generating means is restored to dormancy unless said signaling condition persists for a predetermined interval.

2. In a telegraph signal responsive circuit, a normally dormant means for generating a sinusoidal timing voltage, means responsive to a received signaling condition having a predetermined characteristic for activating said timing voltage generating means, and means whereby said timing voltage generating means is restored to dormancy unless said signaling condition persists for a predetermined number of half cycles of said timing voltage.

3. In a telegraph signal receiving device, means for receiving code combinations of impulses including start impulses having a predetermined characteristic, normally dormant means for generating a sinusoidal timing voltage, means responsive to impulses having the characteristic of start impulses for activating said voltage generating means, and means operable a predetermined interval after activation of said voltage generating means for maintaining said voltage generating means activated for a predetermined number of cycles, said voltage generating means being restorable to dormant condition upon cessation of said impulse having the characteristic of start impulses before the end of said predetermined interval.

4. In a telegraph signal receiving device, means for receiving code combinations of impulses, normally dormant means set in operation in response to received spacing conditions for generating a pulsating timing voltage, means for counting cycles of said pulsating voltage, means controlled by said counting means for keeping said generating means in operation for a predetermined number of cycles, and means effective upon cessation of said spacing conditions before the first counting operation of said counting means for restoring said generating means to dormant condition.

5. In a telegraph signal receiving device, means for receiving code combinations of signal elements, normally deactivated means for generating timing pulses, means responsive to the first signal element of each code combination for activating said pulse generating means, a plurality of stages of electron discharge tube flip-flop circuit connected in cascade for counting said timing pulses, and means responsive to the first counting operation of said stages of flip-flop circuit for precluding deactivation of said pulse generating means until completion of the counting of a predetermined number of additional pulses.

6. In a telegraph signal receiving system, means for receiving code combinations of signal elements, normally dormant means for generating timing pulses, a plurality of stages of electron discharge tube flip-flop circuit for counting timing pulses generated by said generating means when activated, and means dependent upon concurrence of a predetermined incoming signal condition and predetermined coexisting conditions of said counting stages for holding said generating means dormant.

7. In a telegraph signal receiving system, means for receiving code combinations of signal elements, normally dormant means for generating timing pulses, a plurality of stages of electron discharge tube flip-flop circuit for counting timing pulses generated by said generating means when activated, means dependent on concurrence of a predetermined incoming signal condition and predetermined conditions of said counting stages for holding said generating means dormant and responsive to a change in said incoming signal condition for activating said generating means, and means effective only upon return of said counting stages to said predetermined conditions in the course of a timing pulse counting operation for deactivating said generating means.

8. In a telegraph signal receiving system, means for receiving code combinations of signal elements comprising an odd number of said signal elements, normally dormant means for generating a pulsating timing voltage at a rate of one cycle for each received signal element, means responsive to the first element of each received code combination for activating said generating means, counting means for counting said cycles, said counting means being inherently capable of registering only an even number count exceeding by one the number of signal elements in a code combination, and means for causing said counting means to register two counts in response to the first cycle of said timing voltage and a single count for each subsequent cycle.

9. In a telegraph signal receiving system, means for receiving code combinations of signal elements comprising an odd number of said signal elements, normally dormant means for generating a pulsating timing voltage at a rate of one cycle for each received signal element, means responsive to the first signal element of each received code combination for activating said generating means, counting means for counting said cycles, said counting means being inherently capable of registering only an even number count exceeding by one the number of signal elements in a code combination, means for causing said counting means to register two counts in response to the first cycle of said timing voltage and a single count for each subsequent cycle, and means controlled by said counting means for deactivating said timing pulse generating means upon reaching the limit of its count registering capability.

10. In a telegraph signal receiving device, means for receiving code combinations of impulses, normally dormant means for generating timing pulses, a plurality of stages of electron discharge tube flip-flop circuit for counting timing pulses generated by said generating means when activated, each of said stages comprising a pair of grid-controlled electron discharge tubes having their control grids and anodes mutually cross-coupled resistively, means comprising a grid-controlled electron discharge tube for starting and stopping said timing pulse generating means, and means comprising connections from the control grid of one tube of each of said flip-flop stages to the grid of said start and stop control tube for rendering it conductive only when the tubes having their control grids connected to its control grid are conductive, said connections accurately determining the potential applied to the grid of said start and stop control tube by virtue of the inherent limiting action of grids and independently of variable tube characteristics and variable operating potentials.

11. In a regenerative telegraph repeater, an electron discharge tube responsive to received code combinations of impulses, electron discharge tube means alternatively conditioned for operation in accordance with the marking or spacing nature of impulses received by said receiving means, electron discharge tube means for generating timing pulses for operating the conditioned one of said electron discharge means, a flip-flop circuit of electron discharge tubes operable to one or the other of its conductive conditions in accordance with the operation of one or the other of said conditioned electron discharge means, electron discharge means controlled in accordance with the conductivity of said flip-flop circuit for retransmitting code combinations of impulses, and electron discharge means for counting said timing pulses to time complete code combinations of impulses.

12. In a regenerative telegraph repeater, electron discharge tube means for receiving code combinations of impulses, electron discharge tube means for timing the retransmission of impulses, and an output circuit for retransmitting impulses under the joint control of said receiving means and said timing means, said output circuit comprising a grid-controlled electron discharge tube, a cathode-coupled signal transmitting conductor, a grid-controlled electron discharge tube having its discharge path substantially shunting the cathode load of the first-mentioned grid-controlled tube, and means for rendering one of said tubes conductive for marking impulse retransmission and the other conductive for spacing impulse retransmission whereby the discharge paths of said tubes afford substantially equal impedances for accommodating reactive characteristics of said signal transmitting conductor for marking and spacing impulse retransmission.

13. In a telegraph signal receiving device, means for receiving code combinations of impulses, means for generating timing pulses at the rate of one pulse per received telegraph impulse, means for counting said timing pulses and limiting them to the number of impulses in a code combination, and means for adapting said counting means to reception by said receiving device of code combinations each including an additional impulse which comprises means for rendering said counting means insensitive to one of the timing impulses generated by said generating means.

14. In a telegraph signal receiving device, means for receiving code combinations of impulses, means for generating timing pulses at the rate of one pulse per received impulse of the code combinations, means for counting and limiting said timing pulses to a predetermined number in conformity with the number of impulses in the code combinations, and means for adapting said receiving device to code combinations including one more impulse which comprises an attachment associable with said counting means for rendering it insensitive to one of said timing pulses.

15. In a telegraph signal receiving system, means for receiving code combinations of a predetermined number of signal elements, normally dormant means for generating a pulsating timing voltage at a rate of one cycle for each received signal element, means responsive to the first element of each received code combination for activating said generating means, counting means for counting said cycles, said counting means being inherently capable of registering a count exceeding the number of signal elements in a code combination, and means for causing said counting means to register more than one count for at least one cycle to the extent of the excess of said count capability and a single count for each of the other cycles.

16. In a telegraph signal receiving system, means for receiving code combinations of a predetermined number of signal elements, normally dormant means for generating a pulsating timing voltage at a rate of one cycle for each received signal element, means responsive to the first signal element of each received code combination for provisionally activating said generating means, counting means for counting said cycles, said counting means being inherently capable of registering a count exceeding by one the number of signal elements in a code combination, means for causing said counting means to register two counts in response to the first cycle of said timing voltage and a single count for each subsequent cycle, means responsive to the first of said two counts for eliminating the provisional aspect of the activation of said generating means, and means controlled by said counting means for deactivating said generating means upon reaching the limit of its count registering capability.

17. In a telegraph repeater, an input circuit for receiving code combinations of impulses, and an output circuit for retransmitting said code combinations of impulses, said output circuit comprising a grid-controlled electron discharge tube, a transmitting conductor cathode-coupled thereto, a grid-controlled electron discharge tube having its discharge path substantially shunting the cathode load of the first-mentioned grid-controlled tube, and means for rendering one of said tubes conductive for marking impulse retransmission and the other conductive for spacing impulse retransmission whereby the discharge paths of said tubes afford substantially equal impedances for accommodating reactive characteristics of said signal transmitting conductor for marking and spacing impulse retransmission.

18. In a telegraph repeater, an input circuit for receiving code combinations of impulses including a grid-controlled vacuum tube responsive to said impulses, and an output circuit for retransmitting said code combinations of impulses, said output circuit comprising a grid-controlled vacuum tube, a transmitting conductor cathode-coupled thereto, a grid-controlled vacuum tube having its discharge path substantially shunting the cathode load of the first-mentioned grid-controlled vacuum tube of said output circuit, and means for rendering one of said tubes conductive for marking impulse retransmission and the other conductive for spacing impulse retransmission whereby the discharge paths of said tubes afford substantially equal impedances in association with the capacitance of said signal transmitting conductor for marking and spacing impulse retransmission.

19. Regenerative repeater for start-stop printing telegraph signal combinations comprising a time base circuit for timing and counting the elements of a signal combination, means dependent upon the commencement of a received start element for rendering said time base circuit operative, means for examining the incoming signal condition at a time subsequent to said commencement and not later than the lapse of half a signal element period, and means operative upon said condition being then marking to render said time base circuit inoperative and to restore the regenerator to initial condition.

20. Regenerative repeater for start-stop printing telegraph signal combinations comprising a time base circuit, means operative upon the receipt of a start element to start said time base circuit into operation to time the elements of a signal combination, examining means under the control of said time base circuit to examine the condition of the incoming signals during each signal element period, means to re-transmit a signal element of the kind determined by said examining means, means operative upon the condition of the incoming signals being spacing during the examination of the stop element to restore the said time base circuit to initial condition, and to transmit a spacing condition until after the subsequent receipt of a marking condition and means operative upon the receipt of said marking condition to cause the control of the starting up of said time base circuit to be dependent upon the subsequent commencement of a received spacing condition and to cause the transmission of a marking condition.

21. Regenerative repeater for start-stop printing telegraph signal combinations comprising a time base circuit, means operative upon the receipt of a start element to start said time base circuit into operation to time the elements of a signal combination, examining means under the control of said time base circuit to examine the condition of the incoming signal during each signal element period, means to re-transmit a signal element of the kind determined by said examining means, means operative upon the persistence of the start condition for a period longer than the period of a signal combination to cause said retransmitting means to continue to transmit a start condition during such period of persistence, and means operative on the receipt of a stop condition following said persistent start condition to restore the time base circuit to initial condition ready to be restarted by the subsequent receipt of a start condition and to cause the retransmission of a stop condition in the interim.

References Cited in the file of this patent

UNITED STATES PATENTS

| | | |
|---|---|---|
| 2,430,547 | Anderson | Nov. 11, 1947 |
| 2,454,089 | Rea | Nov. 16, 1948 |
| 2,474,490 | Pelle | June 28, 1949 |